United States Patent

Hattori

[11] Patent Number: 5,822,501
[45] Date of Patent: Oct. 13, 1998

[54] OPTICAL SCANNING DEVICE HAVING DICHROIC MIRROR FOR SEPARATING READING AND RECORDING LIGHT BEAMS

[75] Inventor: Yutaka Hattori, Kuwana, Japan

[73] Assignee: Brother Kogyo Kabushiki Kaisha, Nagoya, Japan

[21] Appl. No.: 706,250

[22] Filed: Sep. 4, 1996

[30] Foreign Application Priority Data

Sep. 4, 1995 [JP] Japan ................................. 7-226427

[51] Int. Cl.$^6$ ................................................. H04N 1/04
[52] U.S. Cl. ........................ 395/107; 358/474; 358/481; 359/204
[58] Field of Search .................... 358/474, 475, 358/480, 481, 296, 300; 359/204–206; 347/231–233, 258, 262; 395/107; H04N 1/04

[56] References Cited

U.S. PATENT DOCUMENTS

| | | |
|---|---|---|
| 4,386,374 | 5/1983 | Kimoto . |
| 4,514,079 | 4/1985 | Okada et al. . |
| 5,162,821 | 11/1992 | Fukuchi et al. . |
| 5,488,489 | 1/1996 | Miyagawa . |
| 5,528,412 | 6/1996 | Shinada ................................... 347/258 |
| 5,596,424 | 1/1997 | Iizuka et al. .............................. 358/474 |
| 5,600,487 | 2/1997 | Kiyomoto et al. . |

*Primary Examiner*—Kim Yen Vu
*Attorney, Agent, or Firm*—Oliff & Berridge, PLC

[57] ABSTRACT

An optical scanning device includes an image reading station and a printing station wherein image reading and recording operations are accomplished using an optical system common to both the image reading station and the laser printing station. Recording and reading light beams having different wavelengths are separately emitted from two semiconductor lasers and are combined by a first dichroic mirror. The combined laser beams are deflected by a polygon mirror to scan a predetermined range and then focused by a focusing lens. The laser beams emerging from the focusing lens are applied to a second dichroic mirror where the recording and reading light beams are separated. The recording light beams are directed toward a photosensitive drum to irradiate thereonto. The reading light beam is directed toward an original document placed face down on a glass plate. The scattering light from the original document is detected by photo-detectors to produce an image signal indicative of the image on the original document. To print the original document, the recording light beam is modulated according to the image signal output from the photo-detectors.

18 Claims, 6 Drawing Sheets

OPTICAL SCANNING DEVICE HAVING DICHROIC MIRROR FOR SEPARATING READING AND RECORDING LIGHT BEAMS

BACKGROUND OF THE INVENTION

1. Field of the Invention

The present invention relates to an optical scanning device for reading images on an original document and simultaneously printing the images on a recording medium.

2. Description of the Related Art

There have been known laser beam printers for printing images through an electrophotographic process. In the laser beam printer, a laser beam modulated in accordance with an image signal is irradiated onto a rotating photosensitive drum to form an electrostatic latent image thereon. The latent image is developed into a visual image using toner particles, and the toner image is transferred onto a recording medium and thermally fixed by a thermal fixing unit.

Image readers have also been known in the art, which read images on an original document two-dimensionally using one-dimensional CCDs (charge coupled devices) and a scanning mirror.

An apparatus including a laser beam printer and an image reader has also been known in the art, which is capable of reading images in the image reader and immediately printing the same in the laser beam printer.

Figure 1:
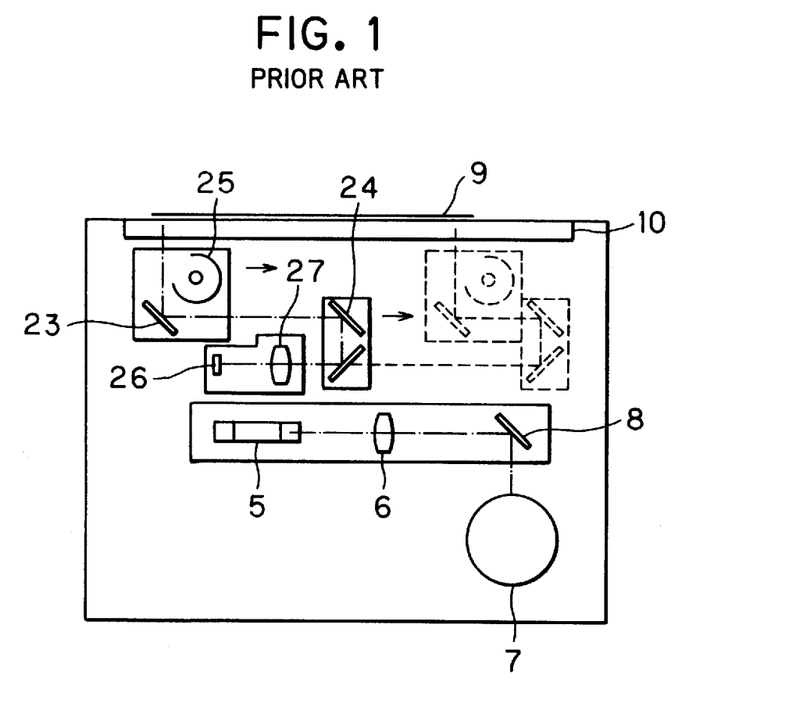
FIG. 1 is a cross-sectional view showing a conventional optical scanning device.

FIG. 1 schematically shows such an apparatus. An image reading station is disposed above the apparatus. A line-shaped light source 25 extends in a direction perpendicular to the sheet of drawing and irradiates light toward the original document 9 placed on a glass plate 10 face down. The line-shaped light source 25 moves in the direction indicated by an arrow together with the mirror 23. Light reflected from the original document 9 is guided by mirrors 23 and 24 and focused on CCDs 26 by a focusing lens 27.

More specifically, before starting the scanning operation, the mirror/light source unit 23, 25 is placed in a rest position as indicated by a solid line in FIG. 1. The mirror/light source unit 23, 25 moves from the rest position to a scan end position indicated by a dotted line in FIG. 1 to scan the image bearing surface of the original document 9. A pair of mirrors 24 move from a start position indicated by a solid line to a terminal position indicated by a dotted line in synchronism with the movement of the mirror/light source unit 23, 25. The mirrors 24 move at a half speed of the moving speed of the mirror/light source unit 23, 25 to maintain the optical distance between the original document 9 and the focusing lens 27 at constant. Thus, the image is duly formed on the CCDs 26 regardless of the position where the mirror/light source unit 23, 25 is scanning. The CCDs 26 are aligned in the direction perpendicular to the sheet of drawing.

A printing station is disposed in the lower portion of the apparatus. The printing station includes a laser light source (not shown) emitting a laser beam that is modulated in accordance with an image signal output from the image reading station. The modulated laser beam is irradiated onto a polygon mirror 5. The polygon mirror 5 has a multiplicity of reflection facets and is rotated about its central shaft to deflect or scan the laser beam incident on one reflection facet of the polygon mirror 5. The laser beam then passes through a focusing lens 6 and is reflected on a reflection mirror 8 to guide it downwardly. A photosensitive drum 7 is rotatably disposed below the reflection mirror 8. The laser beam is irradiated onto the peripheral surface of the photosensitive drum 7 to form an electrostatic latent image thereon. Toner particles are brought into contact with the photosensitive drum 7 to develop the latent image and form a toner image thereon corresponding to the image on the original document 9. The toner image thus formed is transferred onto a recording medium and the transferred image is thermally fixed. Through the above processes, the images read in the image reading station can be printed with the same apparatus.

A problem with the apparatus shown in FIG. 1 is that the apparatus is large in size because of incorporation of the image reading station and the laser printing station, and is expensive in cost because a large capacity memory is required for storing the image data obtained through the reading operation. Further, for the purpose of eliminating the imbalance of the reading and printing accuracies, either the reading accuracy or the recording accuracy is unduly enhanced. This means that either the printing or reading performance is not as good as the remainder. In addition, a relatively long time is required to complete printing.

U.S. Pat. No. 4,386,374 proposes a scanning type electronic copying machine using a common optical system. However, because the common optical system cannot irradiate light onto both the original document and the photosensitive drum simultaneously; reading and printing operations are performed alternately. That is, two line scannings are required for reproducing one line data. This degrades the efficiency of the copying machine.

U.S. Pat. No. 4,514,079 discloses using a half mirror for separating one or two light beams emitted from a single light source. One of the separated light beams is used for exposure of the photosensitive drum and another for reading the images on the original document. A problem with this type of the apparatus is that the amount of light utilized in reading and printing the image is small. Another problem is that the reading accuracy is low because reading and printing of the images are performed using the same light source emitting the light beams of the same wavelength. Further, the apparatus is expensive because a correction lens is required.

U.S. Pat. No. 5,488,489 discloses performing both reading and printing operations with one scan. However, an original document and a photosensitive drum are arranged in the scanning direction, therefore, the scanning width is twice as long as the width of the original document or the photosensitive drum. As a result, the optical system becomes expensive in cost and large in size.

SUMMARY OF THE INVENTION

The present invention has been made to solve the aforementioned problems of the conventional apparatuses, and accordingly it is an object of the present invention to provide an optical scanning device wherein image reading and recording operations are accomplished with a single apparatus using an optical system common to both an image reading station and a printing station.

Another object of the present invention is to provide an image scanning device that is compact in size and low in cost.

Still another object of the present invention is to provide an image scanning device wherein an image reading accuracy can be enhanced independently of an image recording accuracy.

To achieve the above and other objects, there is provided an optical scanning device that includes more than two light sources, for example, a first light source and a second light source. The first light source emits a first light beam having a first wavelength. The second light source emits a second light beam having a second wavelength different from the first wavelength. A deflector is provided for deflecting the first light beam and the second light beam to provide a first scanning light beam and a second scanning light beam, respectively. A focusing means is provided for focusing the first scanning light beam and the second scanning light beam. Printing means is provided for printing images. The printing means includes a photosensitive member for forming an electrostatic latent image thereon corresponding to the images to be printed by the printing means. Light beam separation means is disposed between the deflector and the photosensitive member to receive the first scanning light beam and the second scanning light beam for separating the second scanning light beam from the first scanning light beam. A document placing means is provided for placing an original document thereon. The document placing means and the photosensitive member are disposed in optically conjugate positions with respect to the focusing means. In the optical scanning device thus constructed, the second scanning light beam separated by the light beam separation means is irradiated onto the original document placed on the document placing means for reading images on the original document.

Each of the first light source and the second light source comprises a laser source emitting a laser beam having a directionality, for example, a semiconductor laser. The second light source emits visible light having a wavelength in a range from 400 nm to 700 nm. The second light source may be constructed with a semiconductor laser emitting a laser beam having a predetermined wavelength, and a non-linear optical element for receiving the laser beam emitted from the semiconductor laser and converting the predetermined wavelength to the second wavelength shorter than the predetermined wavelength, the second wavelength falling within the range from 400 nm to 700 nm. A solid-state laser can be used in lieu of the semiconductor laser.

Preferably, the light beam separation means is a first dichroic mirror having a reflectivity changeable depending on a wavelength of a light beam incident thereon. The first dichroic mirror has an extinction ratio of $1/1000$ wherein the resistivity of the first light beam is greater than the resistivity of the second light beam.

Light beam combining means may further be provided, which is disposed to receive the first light beam emitted form the first light source and the second light beam emitted from the second light source, for combining the first light beam and the second light beam to form a combined light beam, the combined light beam being applied to the deflector. Preferably, the light beam combining means is a second dichroic mirror having a reflectivity changeable depending on a wavelength of light beam incident thereon. A light beam that is reflected from the first dichroic mirror is also reflected from the second dichroic mirror.

The first scanning light beam separated by the light beam separation means is irradiated onto the photosensitive drum. Photo-detecting means is further provided for receiving light reflected from the original document to detect the images on the original document. The photo-detecting means outputs an image signal, wherein the first light beam emitted from the first light source are modulated according to the image signal.

A line memory may be provided for storing one line worth of the image signal corresponding to one scan of the second light beam, wherein the first light beam emitted from the first light source is modulated according to the one line worth of the image signal retrieved from the line memory. Alternatively, a frame memory may be provided for storing one page worth of the image signal corresponding to images on one page of the original document, wherein the first light beam emitted from the first light source is modulated according to the one page worth of the image signal retrieved from the frame memory.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

A preferred embodiment of the present invention will be described with reference to the accompanying drawings. In the following description, the same reference numerals as used in FIG. 1 designate the same components.

Figure 2:
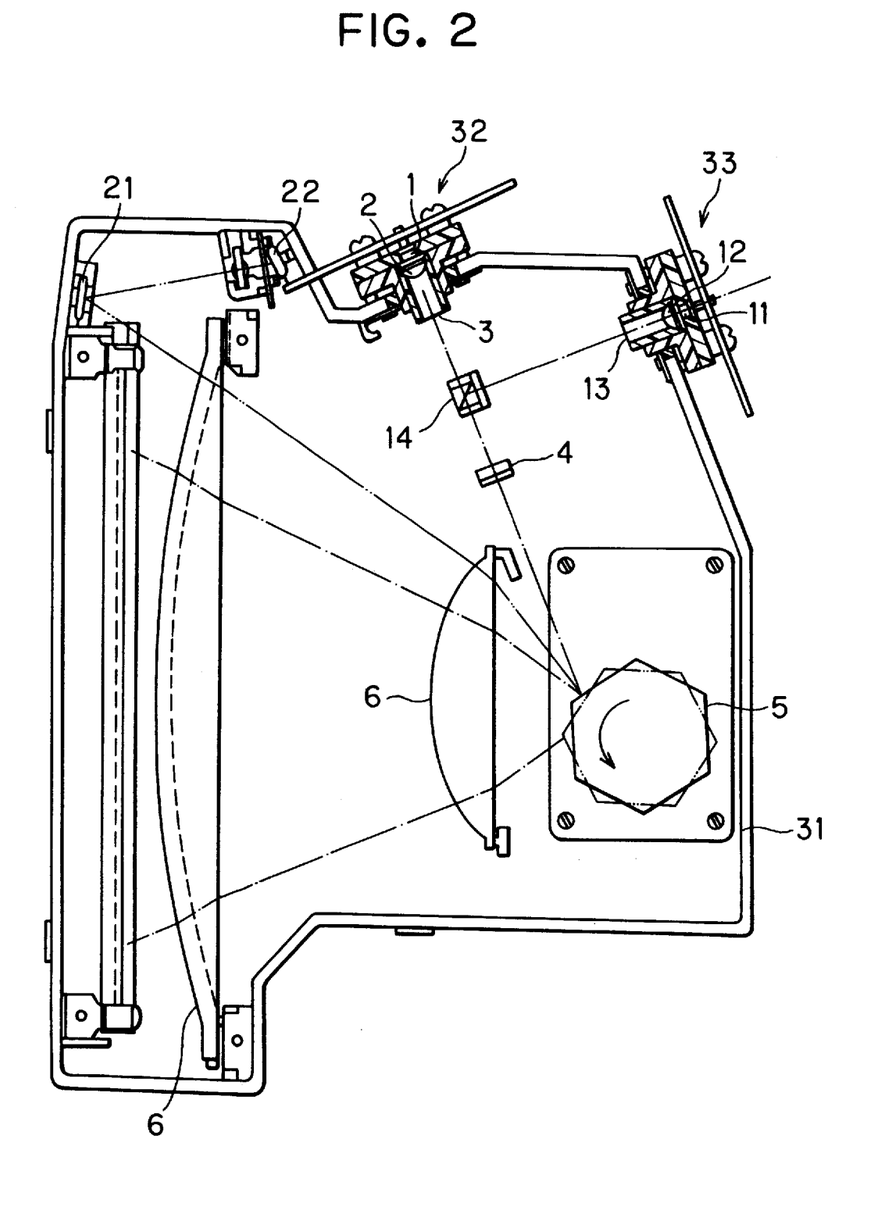
FIG. 2 is a plan view showing an optical scanning device according to one embodiment of the present invention.
Figure 3:
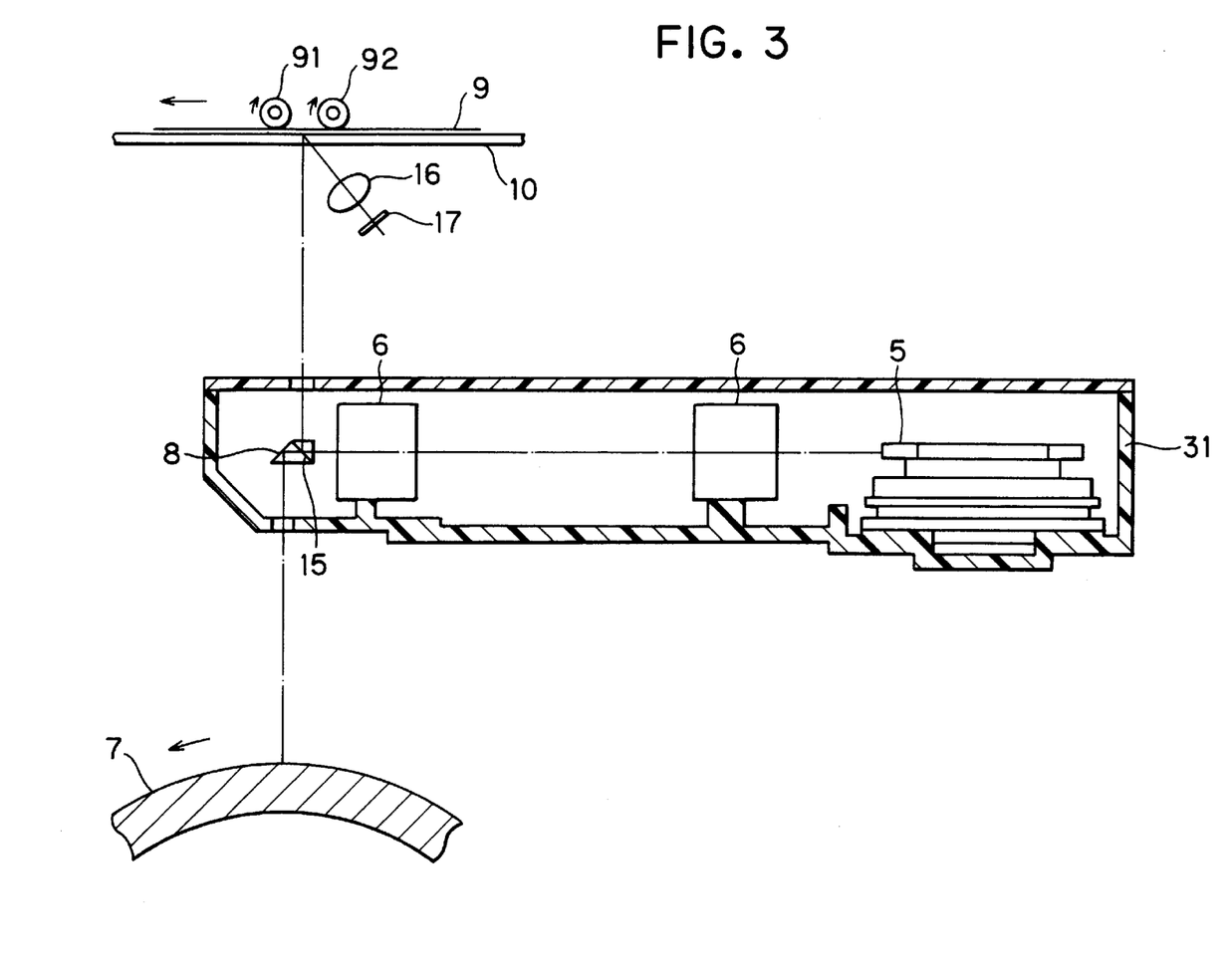
FIG. 3 is a side view showing the optical scanning device shown in FIG. 2.

FIGS. 2 and 3 show an optical scanning device according to an embodiment of the present invention. FIG. 2 is a planar view and FIG. 3 is a side view.

The optical scanning device includes a laser unit 32 mounted on a scanner frame 31. The laser unit 32 includes a semiconductor laser 1 used as a light source for recording images, a collimator lens 2 for converting a light beam from the semiconductor laser 1 into a parallel beam, and a diaphragm 3 for limiting the spot diameter of the parallel beam. These components of the laser unit 32 are integrally formed on the scanner frame 31. A cylindrical lens 4 is disposed in an optical path of the light beam for converging the laser beam into only one direction. A hexagonal polygon mirror 5 is rotatably disposed in the focal point of the cylindrical lens 4. The polygon mirror 5 rotates at a constant angular velocity about a shaft on its center, and the light beam received at one facet of the polygon mirror 5 is scanned in the main scanning direction as the polygon mirror 5 rotates. A focusing lens assembly 6 consisting of two lenses is disposed in the optical path of the light beam reflected from the polygon mirror 5. The focusing lens assembly 6 receives the light beam scanned by the polygon mirror 5 and focuses the same onto the surface of a photosensitive drum 7 so that a minute light spot is irradiated thereonto. The focusing lens assembly 6 has an fθ characteristic enabling to convert the light beam being deflected at a constant angular velocity into the light beam that scans the photosensitive drum 7 at a constant linear velocity.

Another laser unit 33 is mounted on the scanner frame 31. The laser unit 33 includes a semiconductor laser 11 used as a light source for reading images, a collimator lens 12 for converting a light beam from the semiconductor laser 11 into a parallel beam, and a diaphragm 13 for limiting the spot diameter of the parallel beam. These components of the laser unit 33 are also integrally formed on the scanner frame 31. The laser units 32 and 33 are oriented in such directions that the light beams from the two semiconductor lasers 1 and 11 form at right angle. Hereinafter, the light beam from the semiconductor laser 1 will be referred to as "recording light beam", and the light beam from the semiconductor laser 11 as "reading light beam".

A first dichroic mirror 14 is disposed in a position where the recording and reading light beams intersect. The first dichroic mirror 14 allows the wavelength of the recording light beam to transmit therethrough but reflects the wavelength of the reading light beam therefrom. The reading light beam incident on the first dichroic mirror 14 at 45° is combined with the recording light beam that has transmitted through the first dichroic mirror 14, and the combined light beams advances toward the polygon mirror 5 along the same optical path.

A second dichroic mirror 15 and a reflection mirror 8 are disposed between the focusing lens 6 and the photosensitive drum 7. Similar to the first dichroic mirror 15, the second dichroic mirror 15 allows the recording light beam to transmit therethrough but reflects the wavelength of the reading light beam therefrom. The recording light beam transmitted through the second dichroic mirror 15 is reflected upon the reflection mirror 8 and directed downwardly toward the photosensitive drum 7 as shown in FIG. 3. The reading light beam reflected from the second dichroic mirror 15 is directed upwardly.

Figure 4:
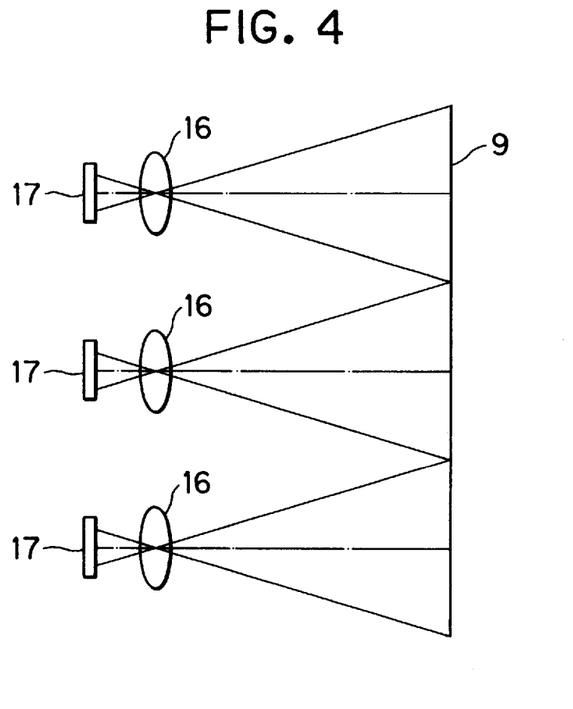
FIG. 4 is a schematic view showing photo-detectors.

Above the laser scanner unit, there are disposed a glass plate 10 for placing an original document 9 thereon and drive rollers 91 and 92 for moving the glass plate 10 in the direction indicated by an arrow shown in FIG. 3. As shown in FIG. 4, three pairs of a lens 16 and a photo-detector 17 are juxtaposed below the glass plate 10 at an equi-interval in a direction in parallel with the scanning direction to detect the scattering light from the original document 9. Photodiodes are used for the photo-detectors 17. The glass plate 10 is disposed in a focal point of the focusing lens assembly 6. The position of the glass plate 10 is in an optically conjugate relationship with the photosensitive drum 7, so that the diameter of the light spot that scans the photosensitive drum 7 is equal to that of the light spot that scans the original document 9. Therefore, image recording accuracy and image reading accuracy are equal to each other, and thus the image on the original document 9 can be reproduced on the photosensitive drum 7 with good fidelity.

The light beam irradiated onto the original document 9 is the reading light beam emitted from the semiconductor laser 11 and reflected upon the second dichroic mirror 15. The recording and reading light beams emitted from the semiconductor lasers 1 and 11 are combined by the first dichroic mirror 14 and then separated by the second dichroic mirror 15. Only the recording light beam is irradiated onto the photosensitive drum 7 and only the reading light beam is irradiated onto the original document 9.

A beam reflecting mirror 21 and a beam detector 22 are disposed inside the scanner frame 31 and in a position outside the light beam irradiation region on the photosensitive drum 7. The beam reflecting mirror 21 reflects the recording light beam and the beam detector 22 detects the recording light beam reflected from the beam reflecting mirror 21 to produce a horizontal sync signal.

With the apparatus thus constructed, images on the original document 9 can be read and recorded through the operations to be described below.

The recording laser beam emitted from the semiconductor laser 1 is modulated by a modulator to be described later, and the resultant recording light beam passes through the collimator lens 2 and is thereby converted into a parallel beam. The spot diameter of the parallel beam is limited to a predetermined size by virtue of the diaphragm 3. The recording light beam then passes through the first dichroic mirror 14 and the cylindrical lens 4 and is then applied to the polygon mirror 5. The recording light beam forms a line image on the facet of the polygon mirror 5. Because the polygon mirror 5 is rotating, the recording light beam incident on the polygon mirror 5 is deflected and directed toward the focusing lens assembly 6. The recording light beam emerging from the focusing lens assembly 6 transmits through the second dichroic mirror 15 and is reflected by the reflection mirror 8 and directed toward the photosensitive drum 7 disposed downwardly of the laser scanner unit. The recording light beam is scanned onto the rotating photosensitive drum 7 to thereby form a two-dimensional electrostatic latent image thereon. The latent image is developed by toner particles to form a visible image. The visible image is transferred onto a recording medium and thermally fixed thereon by a thermal fixing unit as is well known in the art.

Image reading operation with the apparatus described above will next be described.

The reading light beam emitted from the semiconductor laser 11 passes through the collimator lens 12 which converts the light beam into a parallel beam. The spot diameter of the parallel beam is limited to a predetermined size by virtue of the diaphragm 13. The reading light beam is then reflected from the first dichroic mirror 14 and combined with the recording light beam. The combined light beam is applied to the polygon mirror 5. Like the recording light beam, the reading light beam incident on the polygon mirror 5 is deflected by the rotating polygon mirror 5 and directed toward the focusing lens assembly 6. The reading light beam emerging from the focusing lens assembly 6 is reflected on the second dichroic mirror 15 and is irradiated onto the glass plate 10 on which the original document 9 is placed face down.

In accordance with the rotations of the polygon mirror 5, the reading light beam one-dimensionally scans the images on the original document. Because the original document 9 is moving in the direction indicated by the arrow by the drive rollers 91 and 92, the reading light beam raster scans the original document 9 to thus two-dimensionally irradiate the reading light beam onto the entire face of the original document. The reading light beam irradiated onto the original document 9 is reflected therefrom and scattering light from the original document 9 is focused by the lenses 16 and applied to the photo-detectors 17. When the images on the original document 9 are depicted with ink or dye, such images are typically recognized by human eyes as black. However, if such images are irradiated with infrared rays, the light applied to the image portion may also be reflected therefrom. That is, the image portions are sensed as white, i.e., no images present. For this reason, it is desirable that the original document 9 be read with visible light. The semiconductor laser 11 used as the light source of the reading light beam is required to emit the light beam having a wavelength ranging from 400 nm to 700 nm. On the other hand, the semiconductor laser 1 used as the light source of the recording light beam is not required to emit visible light. It is desirable to use near-infrared ray having a wavelength of 780 nm as the recording light beam in view of spectral sensitivity of general photosensitive drums 7 and cost of the light source.

FIG. 4 shows the positional relation of three pairs of lens 16 and the photo-detector 17 with the original document 9. The lens and detector paris are aligned in a direction in parallel with the scanning direction of the original document 9. The lens and detector pairs are disposed at an equi-pitch so that the image reading range of the original document 9 is equally shared. The original document 9 and the photo-detectors 17 are in optically conjugate relationship with each other with respect to the lenses 16. The focusing magnification of the lens 16 is determined depending on the size of the photo-detector 17. When detecting reflected light beams from the original document 9 with three photo-detectors 17 while scanning, for example, the shorter width (210 mm) of an A4 size document, each photo-detector 17 must cover 70 mm width of the original document 9. With the photo-detector having an effective width of 5 mm, the lens 16 may have an image formation magnification of $\frac{1}{14}$. The output signal from the respective photo-detectors 17 are subjected to additive computation and a time series signal is obtained through detection of the reflected scattering light having an amount of light changing in accordance with the image on the original document 9. In this manner, the two-dimensional image on the original document 9 can be read.

Figure 5:
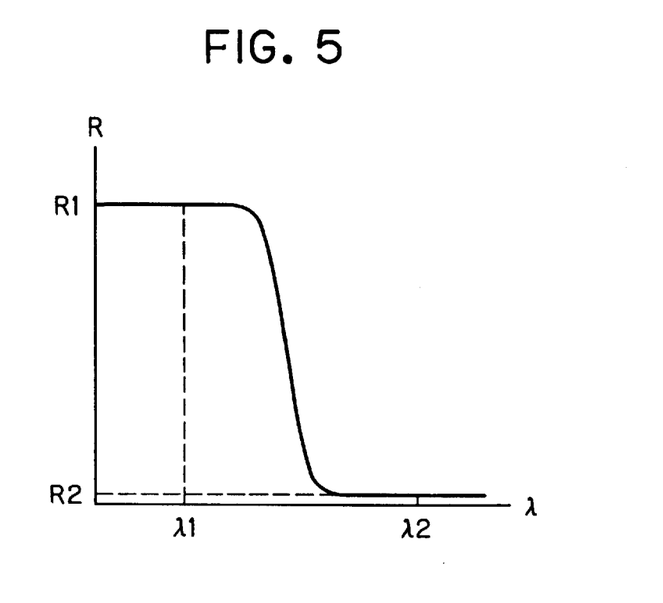
FIG. 5 is a graphical representation showing a spectral reflective characteristic of a dichroic mirror.

In this embodiment, the first dichroic mirror 14 is used for combining the recording light beam and the reading light beam and the second dichroic mirror 15 is used for separating the two light beams. The dichroic mirrors are optical elements which reflect or transmit the light beam depending on its wavelength. FIG. 5 is a spectral reflection characteristic of a dichroic mirror, wherein the axis of abscissa represents wavelength, and the axis of ordinate reflectivity.

Assuming that the wavelength of the reading light beam is $\lambda 1$ and that of the recording light beam is $\lambda 2$ longer than $\lambda 1$, the first and second dichroic mirrors 14 and 15 have reflectivity R1 for the wavelength $\lambda 1$ and reflectivity R2 that is smaller than R1 for the wavelength $\lambda 2$. An extinction ratio of the dichroic mirrors 14 and 15 is given by R2/R2, which represents a wavelength separation characteristic. When image recording and image reading are simultaneously performed using dichroic mirrors of low extinction ratio, the reading light beam may be irradiated onto the photosensitive drum as a stray light which acts as a bias light to the photosensitive drum, resulting in production of a background noise of the recorded image. The recording light beam adversely irradiated onto the original document 9 will be picked up by the photo-sensors 17 as noise.

Because a modulation factor, which is a ratio of an amount of light when light irradiation to the photosensitive drum 7 is ON to an amount of light when light irradiation is OFF, must be 100 or so. If an amount of light irradiated onto the original document 9 for reading the images thereon is 1 mW, and an amount of light irradiated onto the photosensitive drum 7 for recording images is 100 $\mu$W, an allowable amount of light applied to the photosensitive drum 7 as a bias light is 1 $\mu$W. Therefore, the extinction ratio of the dichroic mirror 16 needs to be at least $\frac{1}{1000}$.

The first dichroic mirror 14 serving as a combining means of two light beams determines an efficiency of light sources. The second dichroic mirror 15 serving as a separation means for separating one beam from the other is not required to have an extinction ratio as high as that of the first dichroic mirror 14. It is conceivable to employ the same components having the same extinction ratio to the first and second dichroic mirrors 14 and 15 in order to enhance the efficiency. However, it is advantageous in terms of cost to employ a dichroic mirror having a half mirror surface formed with a metal single layer film rather than a dichroic mirror having a mirror surface formed with a dielectric multi-layer film. If the same type dichroic mirrors are used for both the first and second dichroic mirrors 14 and 15, the wavelength of light that is reflected from the first dichroic mirror 14 will also be reflected from the second dichroic mirror 15. Therefore, if the first dichroic mirror 14 is arranged to reflect the reading light beam therefrom, the second dichroic mirror 15 must also be arranged to reflect the same reading light beam.

Figure 6:
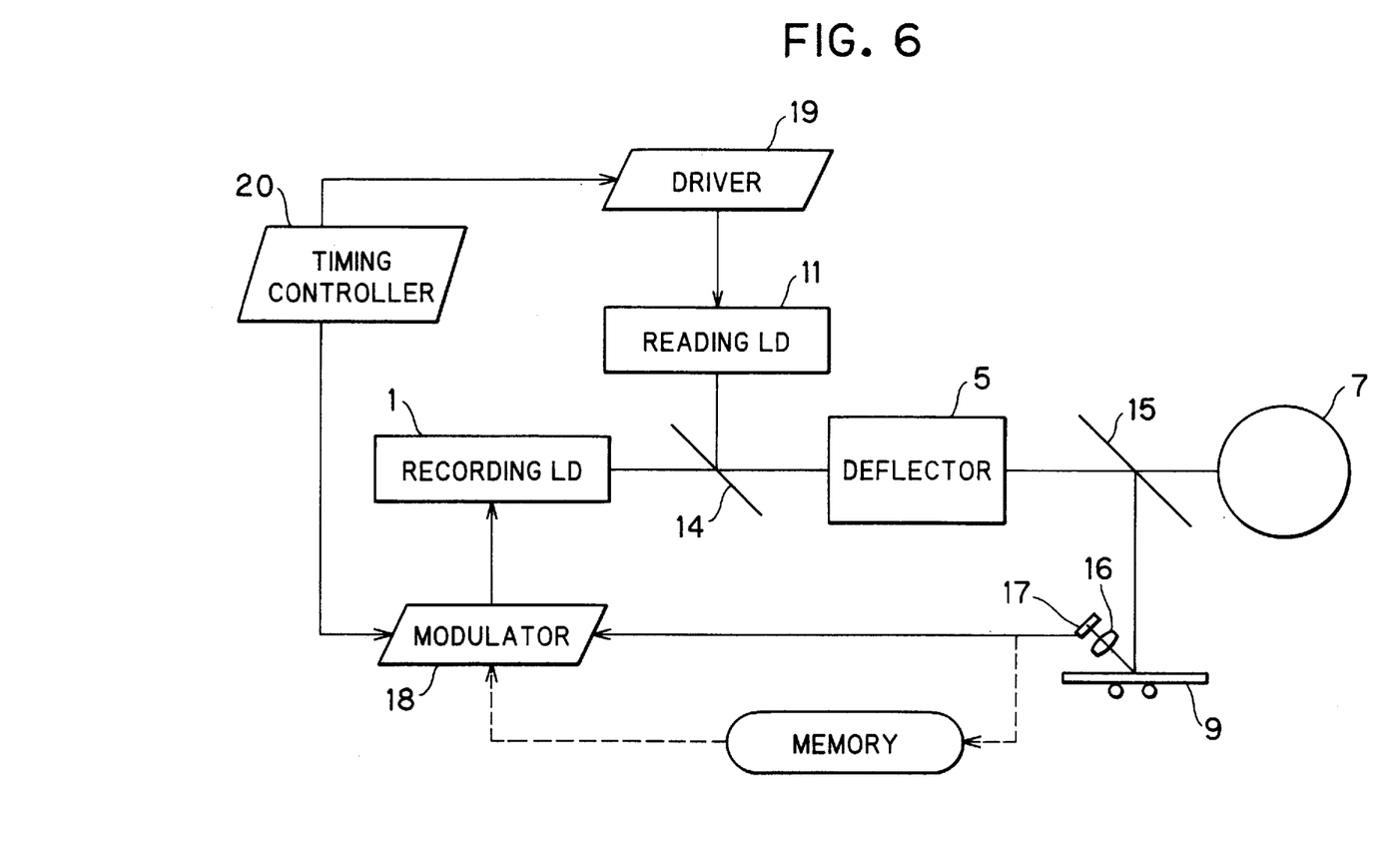
FIG. 6 is a block diagram for illustrating reading and recording operations of images in the optical scanning device.

FIG. 6 is a block diagram for illustrating document reading operations and image recording operations. The recording light beam emitted from the semiconductor laser (recording laser diode (LD)) 1 passes through the first dichroic mirror 14 and is incident on the polygon mirror 5 serving as a deflector. The recording light beam deflected by the polygon mirror or deflector 5 further passes through the second dichroic mirror 15 and is irradiated onto the photosensitive drum 7. On the other hand, the reading light beam emitted from the semiconductor laser (reading laser diode) 11 is reflected from the first dichroic mirror 14 and combined with the recording light beam. The combined light beam is then deflected by the polygon mirror or deflector 5 and reflected from the second dichroic mirror 15 where the reading light beam is separated from the recording light beam. The reading light beam is directed toward the original document 9 to irradiate the same. The scattering strength of the light reflected from the original document 9 changes depending on the density of the image on the original document 9. The light reflected from the original document 9 is collected by the lenses 16 and picked up by the photodetectors 17. Thus, the image signal representative of the image on the original document is output from the photodetectors 17.

In a copy mode in which the images on the original document 9 is read and recorded using the photosensitive drum 7, the image signal obtained through the image reading operation is used as a modulation signal for the recording semiconductor laser 1. To this end, the output signal from the photo-detector 17 is directly applied to a modulator 18. The semiconductor laser (reading LD) 11 is subjected to CW (continuous wave) lightings by a driver 19. In order to match the line images read at each scan, it is required to coincide the reading start positions. Similarly, when scanning the photosensitive drum 7 while driving the semiconductor laser 1 (recording LD), the recording start positions must be in coincidence with one another. To implement these controls, the beam detector 22 is used to perform timing control. Specifically, the timing control of the image reading operations and image recording operations are implemented by the signal output from the beam detector 22 that is applied to a timing controller 20 so that the timings of the signals generated from the driver 19 and the modulator 18 are brought into coincidence with each other.

More specifically, the light beam indicated by two-dot-chain line in FIG. 2 is reflected from the beam reflecting mirror 21 so that the reflected light beam is applied to the beam detector 22, thereby producing the BD signal. With the BD signal thus obtained, the image start position at each scan can be detected.

Figure 7:
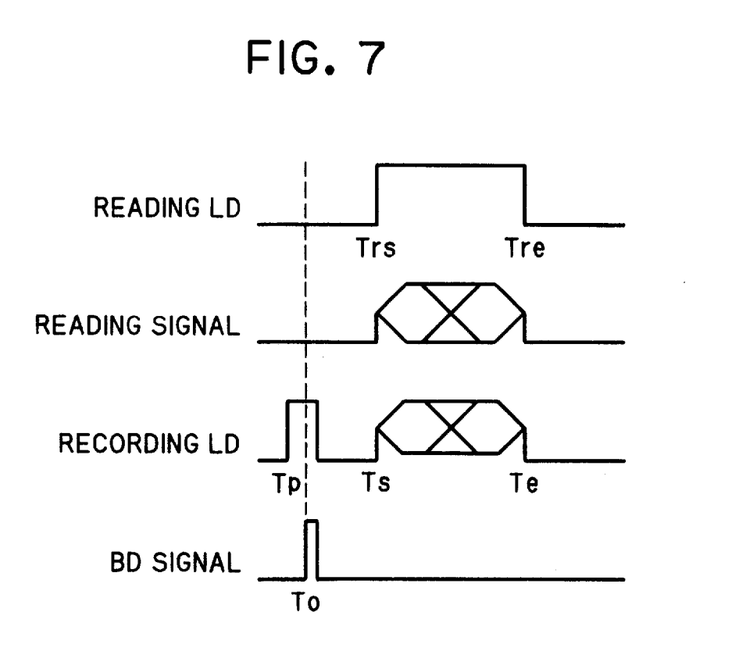
FIG. 7 is a timing chart for illustrating reading and recording operations of images in the optical scanning device.

FIG. 7 is a timing chart showing the operation timings of the reading and recording laser diodes 11 and 1.

The recording laser diode 1 is turned on at time instant $T_P$ that occurs before application of the light beam to the BD sensor 22. At this time, the reading laser diode 11 has been turned off in order to increase the accuracy of the timing. The light beam emitted from the recording laser diode 1 is applied to the beam detector 22 in accordance with rotations of the polygon mirror 5 and the BD signal is thus detected. A reference time instant $T_0$ is set, whereupon the recording laser diode 1 is turned off for a moment. At time instant $T_{rs}$ after expiration of a predetermined period of time from turning off of the recording laser diode 1, the reading laser diode 11 is turned on. At time instant $T_s$ occurring after the time instant $T_{rs}$, the recording laser diode 1 is driven so that the light beam emitted therefrom is modulated in accordance with the image signal picked up by the photodetectors 17. The time from the time instant $T_{rs}$ to time instant $T_s$ allows the image signal output from the photodetectors 17 to be applied to the modulator 18 so as to perform modulation of the light beam from the recording laser diode 1. The reading and recording laser diodes 11 and 1 are turned off at time instants $T_{re}$ and $T_e$ determined corresponding to the range of the image to be scanned (for example, the shorter side width of A4 paper, i.e., 210 mm). The above-described operations are repeatedly performed for each scan.

In the above-described operations, the reading laser diode 11 is turned on only during scanning of the image region in each scan. However, if the accuracy of the BD signal can be preserved with the use of the second dichroic mirror for light beam separation, the reading laser diode 11 may be held in continuous ON state. If it is difficult to record an image read from the original document 9 on the photosensitive drum 7 within the same scanning period for the reason of, for example, signal processing time, one line worth of image data may temporarily be stored in a line memory and output as a modulation signal to the recording laser diode 1 in the subsequent scanning period. Further, one page worth of image data may be stored in a frame memory. The image data stored therein is retrieved and recorded during reading operation of the next document. This processing is particularly advantageous in copying a large number of documents, because time required for copying the documents is not two times as long as the time required in the simultaneous processings.

As described, it is desirable that the original document 9 be read with a visible light. Therefore, the wavelength of the light emitted from the reading laser diode 11 must be in a range of 400 nm to 700 nm. In the case where the color of the images depicted on the original document has a wavelength falling within the range of wavelength of the reading light beam, reading of such images is theoretically impossible. For this reason, it is desirable that the wavelength of the reading light beam be as short as possible. Due to the fact that the semiconductor laser oscillating below 600 nm is not practically available, the wavelength of the laser emitted from the semiconductor laser or a solid-state laser such as YAG laser is shortened with the use of a non-linear optical element such as SHG (second harmonic generation). By doing so, a shorter wavelength laser is readily available.

While only one exemplary embodiment of this invention has been described in detail, those skilled in the art will recognize that there are many possible modifications and variations which may be made in this exemplary embodiment while yet retaining many of the novel features and advantages of the invention. Accordingly, all such modifications and variations are intended to be included within the scope of the appended claims.

What is claimed is:

1. An optical scanning device comprising:

a first light source for emitting a first light beam having a first wavelength;

a second light source for emitting a second light beam having a second wavelength different from the first wavelength;

a deflector for deflecting the first light beam and the second light beam to provide a first scanning light beam and a second scanning light beam, respectively;

a first focusing member that focuses the first scanning light beam and the second scanning light beam;

a printer that prints images, said printer including a photosensitive member for forming an electrostatic latent image thereon corresponding to the images to be printed by said printer;

a light beam separator, disposed between said deflector and said photosensitive member to receive the first scanning light beam and the second scanning light beam, that separates the second scanning light beam from the first scanning light beam;

a document placing member that places an original document thereon, said document placing member and said photosensitive member being disposed in optically conjugate positions with respect to said first focusing member, wherein said second scanning light beam separated by said light beam separator is irradiated along a first optical path onto the original document placed on said document placing member, thereby an image light beam being reflected from the original document;

a second focusing member that directly receives the image light beam reflected from the original document and passes the image light beam reflected from the original document through a second optical path offset from the first optical path to output a focused image light beam; and a photo-detector that directly receives the focused image light beam from said second focusing member to detect the images on the original document.

2. The optical scanning device according to claim 1, wherein each of said first light source and said second light source comprises a laser source emitting a laser beam having a directionality.

3. The optical scanning device according to claim 1, wherein each of said first light source and said second light source comprises a semiconductor laser.

4. The optical scanning device according to claim 1, wherein said second light source emits visible light having a wavelength in a range from 400 nm to 700 nm.

5. The optical scanning device according to claim 4, wherein said second light source comprises a semiconductor laser emitting a laser beam having a predetermined wavelength, and a non-linear optical element for receiving the laser beam emitted from said semiconductor laser and converting the predetermined wavelength to the second wavelength shorter than the predetermined wavelength, the second wavelength falling within the range from 400 nm to 700 nm.

6. The optical scanning device according to claim 4, wherein said second light source comprises a solid-state laser emitting a laser beam having a predetermined wavelength, and a non-linear optical element for receiving the laser beam emitted from said semiconductor laser and converting the predetermined wavelength to the second wavelength shorter than the predetermined wavelength, the second wavelength falling within the range from 400 nm to 700 nm.

7. The optical scanning device according to claim 1, wherein said light beam separator comprises a first dichroic mirror having a reflectivity changeable depending on a wavelength of a light beam incident thereon.

8. The optical scanning device according to claim 7, wherein said first dichroic mirror has an extinction ratio of $1/1000$ wherein the resistivity of the first light beam is greater than the resistivity of the second light beam.

9. The optical scanning device according to claim 7, further comprising a light beam combining member, disposed to receive the first light beam emitted from said first light source and the second light beam emitted from said second light source, for combining the first light beam and the second light beam to form a combined light beam, the combined light beam being applied to said deflector.

10. The optical scanning device according to claim 9, wherein said light beam combining members comprises a second dichroic mirror having a reflectivity changeable depending on a wavelength of light beam incident thereon.

11. The optical scanning device according to claim 1, wherein said light beam separator comprises a first dichroic mirror having a reflectivity changeable depending on a wavelength of light beam incident thereon, and further comprising a second dichroic mirror disposed to receive the first light beam emitted from said first light source and the second light beam emitted from said second light source, for combining the first light beam and the second light beam to form combined light beam, the combined light beam being applied to said deflector, wherein said second dichroic mirror has a reflectivity changeable depending on a wavelength of light beam incident thereon and wherein a light beam that is reflected from said first dichroic mirror is also reflected from said second dichroic mirror.

12. The optical scanning device according to claim 1, wherein the first scanning light beam separated by said light beam separator is irradiated onto said photosensitive drum.

13. The optical scanning device according to claim 12, wherein said photo-detector outputs an image signal upon receiving the focused image light beam, and the first light beam emitted from said first light source is modulated according to the image signal.

14. The optical scanning device according to claim 13, further comprising a line memory for storing one line worth of the image signal corresponding to one scan of the second light beam, wherein the first light beam emitted from said first light source is modulated according to the one line worth of the image signal retrieved from said line memory.

15. The optical scanning device according to claim 13, further comprising a frame memory for storing one page worth of the image signal corresponding to images on one page of the original document, wherein the first light beam emitted from said first light source is modulated according to the one page worth of the image signal retrieved from said frame memory.

16. An optical scanning device comprising:

a first light source for emitting a first light beam having a first wavelength;

a second light source for emitting a second light beam having a second wavelength different from the first wavelength;

a first dichroic mirror, disposed to receive the first light beam emitted from said first light source and the second light beam emitted from said second light source, for combining the first light beam and the second light beam to form a combined light beam;

a deflector for deflecting the combined light beam to provide a scanning light beam;

a first focusing member that focuses the scanning light beam;

a printer that prints images, said printer including a photosensitive member for forming an electrostatic latent image thereon corresponding to the images printed by said printer;

a second dichroic mirror, disposed between said first focusing member and said photosensitive member to receive the scanning light beam, said second dichroic mirror separating the first light beam and the second light beam combined in the scanning light beam;

a document placing member that places an original document thereon, said document placing member and said photosensitive member being disposed in optically conjugate positions with respect to said first focusing member, wherein the second light beam separated by said second dichroic mirror is irradiated along a fist optical path onto the original document placed on said document placing member for reading the images on the original document, thereby an image light beam being reflected from the original document;

a second focusing member that directly receives the image light beam reflected from the original document and passes the image light beam reflected from the original document through a second optical path offset from the first optical path to output a focused image light beam; and a photo-detecting member that directly receives the focused image light beam from said second focusing member to detect the images on the original document and outputting an image signal, wherein the first light beam emitted from said first light source is modulated according to the image signal output from said photo-detecting member.

17. The optical scanning device according to claim 16, wherein each of said first dichroic mirror and said second dichroic mirror has a reflectivity changeable depending on a wavelength of light beam incident thereon.

18. The optical scanning device according to claim 17, wherein said second dichroic mirror has an extinction ratio of $1/1000$ wherein the resistivity of the first light beam is greater than the resistivity of the second light beam.

* * * * *